United States Patent [19]

Oates et al.

[11] Patent Number: 4,805,457
[45] Date of Patent: Feb. 21, 1989

[54] SHAFT TO IMPELLER INTEGRITY DETERMINATION IN ASSEMBLED PUMPS BY REMOTE SENSING

[75] Inventors: James H. Oates, Gilroy; Lun K. Liu, Moraga; Swaminathan H. Sundaram; Hassanali Tafarrodi, both of San Jose, all of Calif.

[73] Assignee: General Electric Company, San Jose, Calif.

[21] Appl. No.: 54,930

[22] Filed: May 28, 1987

[51] Int. Cl.$^4$ ............................................. G01H 1/14
[52] U.S. Cl. ...................................... 73/572; 73/579; 73/659; 73/660; 73/866.4
[58] Field of Search .................. 73/579, 583, 572, 659, 73/660; 415/118; 416/61; 376/245

[56] References Cited

U.S. PATENT DOCUMENTS

| | | | |
|---|---|---|---|
| 4,283,952 | 8/1981 | Newman | 73/579 |
| 4,302,813 | 11/1981 | Kurihara et al. | 73/569 |
| 4,502,239 | 3/1985 | Fukunaga et al. | 73/573 |

Primary Examiner—Stewart J. Levy
Assistant Examiner—Robert P. Bell
Attorney, Agent, or Firm—Robert R. Schroeder

[57] ABSTRACT

In the test of a casing enclosed shaft and impeller for structural integrity against defects such as loose bolts or cracks, an apparatus and process is disclosed which enables in-situ testing to occur within a casing. A model of the shaft and impeller, such as a spare part, is suspended so as to simulate the in casing boundary conditions and is then vibrated. Vibration or "ringing" occurs through a normally exposed end of the shaft far removed from suspected defects. A cap can be used to suspend the shaft and impeller or rotor. Vibration is imparted to the remote end of the shaft, sometimes on the cap, with an instrumented hammer blow of specific duration and known energy. Measurement and resolution of the resultant vibrations and energy dissipating damping occurs by mounting accelerometers to the remote normally exposed shaft end and recording and playing back the vibrations from the mounted accelerometers through a spectrum analyzer. Defects are created on the suspended model and the vibration signatures recorded. Thereafter, the same test is conducted on the casing enclosed suspect shaft and impeller or rotor and the vibrational signature obtained in the rotor matched to the model generated vibrational signature. Prediction of either intact structural integrity or defect is made on the basis of the comparison of measured vibrations. A simultaneous technique of computer modeling the vibrations is disclosed which enables expansion of actual test results to defects outside those specific signatures obtained from the model testing.

10 Claims, 7 Drawing Sheets

INSTALLED PUMP SHAFT

BRIDGE
END OF SHAFT
LOOKING DOWN

SHAFT TO IMPELLER INTEGRITY DETERMINATION IN ASSEMBLED PUMPS BY REMOTE SENSING

BACKGROUND OF THE INVENTION

This invention relates to pumps and turbines having shafts and impellers or rotors confined within casings. Specifically, it relates to a vibrational test for determining the structural integrity of the shaft and impeller or rotor within a casing without removal of the shaft and the impeller or rotor from the casing.

Since the invention herein disclosed is applicable to both pumps and turbines the reader will understand that these terms are used interchangeably. Further, the term impellers—commonly used with pumps—will be interchangeably used with the term rotor—commonly associated with turbines. As will be further understood, pumps have prime movers, typically motors, and turbines have loads, typically generators.

The technique herein disclosed was first used on a proprietary basis to test four circulation pumps on a nuclear reactor. Consequently, the major reference throughout the specification will be to pumps and impellers.

SUMMARY OF THE PRIOR ART

It is known that some mechanics in analyzing machines strike such machines with a hammer and listen. Experience with both the striking blow and the resultant ring enables a gross guess to be made that something is "wrong." This method is fallible, relies on intuition of the mechanic and is not quantitative.

It is known that engineers have used operational vibrational data to diagnose machinery problems such as gear tooth anomaly, bearing deterioration, shaft imbalance, machine misalignment and other defects. However this may be, there remains a class of defects which cannot be so detected. As an example, bolts deep in the interior of a pump securing an impeller to a shaft usually will not be detectable by such technique. Usually, a pump having defects of connection of the shaft to the impeller will operate until the shaft and impeller suddenly—and usually without warning—detach.

Ultrasonic testing (UT) is known. In such tests, sound of a specific frequency is induced in a machine part. This sound is typically reflected from an interface, either a crack or an end of the tested part. By timing the arrival of the returning pulse, location of the interface—such as a metal crack—can be located.

Discovery

We have discovered that pumps and turbines having shafts and attached impellers or rotors in casings are capable of resonating to imparted vibration within the casing just as the model of shaft and attached impellers or rotors resonate to imparted vibration when suspended free of the casings. Suspension of an actual shaft and impeller or rotor in the casing only requires substantially the same boundary conditions of suspension of the model of the shaft and impeller or rotor free of the casing. We have further discovered that the resultant vibrations of the model and the prototype can be used to predict specific defects.

It will be understod that discovery can constitute invention. Insofar as the observations of shaft and impeller or rotor vibrational behavior within a casing to detect defects are novel, invention is claimed.

Statement of the Problem

Inspection of pump and turbine encased shaft and impeller or rotor sometimes is required either because defects of a known class are suspected or alternately because routine maintenance requires such tests. An example is a nuclear reactor coolant pump. If one nuclear reactor coolant pump of a known class has an impeller to shaft failure due to loose bolts securing the impeller to the shaft, it will frequently be required that all other pumps of the same class be inspected for the same defect.

Inspections of such large pumps is other than trivial. First, the shafts, impellers and casings are radioactive. Second, the casing, impellers and shafts are large. Disassembly and access to such pumps is a major mechanical problem. Inspection and repair must occur in shielded containers such as a decontamination bucket and require use of remotely manipulated equipment. Reassembly is tedious, must be carefully done and is not without hazard, such as the failure of the reassembled pump to properly operate. Finally, resultant plant down time during the inspection is prohibitively expensive. Clearly, a technique enabling in the casing inspection of the structural integrity of the shaft and impeller is desired.

Until conception of the protocol disclosed herein, the only known and accepted method for inspection of the structural integrity was to disassemble the pump, obtain direct access to the shaft and impeller, and thereafter at least directly inspect and/or test the impeller and shaft connections. After such inspection and/or test, reassembly was required.

SUMMARY OF THE INVENTION

In the test of a casing enclosed shaft and impeller for structural integrity against defects such as loose bolts or cracks, an apparatus and process is disclosed which enables in-situ testing to occur within a casing. A model of the shaft and impeller, such as a spare part, is suspended so as to simulate the in-casing boundary conditions and is then vibrated. Excitation of the vibration or "ringing" occurs through a normally exposed end of the shaft remote from the suspected defects. A cap can be used to suspend the shaft and impeller or rotor. Vibration is imparted to the remote end of the shaft, sometimes on the cap, with an instrumented hammer blow, and measuring the impulse. Measurement and resolution of the resultant vibrations and energy dissipating damping occurs by mounting accelerometers to the remote normally exposed shaft end and recording and playing back the vibrations from the mounted accelerometers through a spectrum analyzer. Defects are created on the suspended model and the vibration signatures recorded. Thereafter, the same test is conducted on the casing enclosed suspect shaft and impeller or rotor and the vibrational signature obtained in the rotor matched to the model generated vibrational signature. Prediction of either intact structural integrity or defect is made on the basis of the comparison of measured vibrations. A simultaneous technique of computer modeling the vibrations is disclosed which enables expansion of actual test results to defects outside those specific signatures obtained from the model testing.

The preferred process on a pump having a vertical shaft and lower mounted impeller employs structural analysis to identify structural frequencies and mode shapes of the shaft assembly and relies on the subtle fact that the massive impeller or rotor at the bottom of the vertical shaft tends to act as a point of fixity. This causes the shaft to respond as a simple fixed-free beam when subjected to force inputs at the accessible top of the shaft. The response of the shaft is a function of the stiffness of the shaft-to-impeller or rotor bolted interface; linear and predictable when properly tensioned and nonlinear when bolting integrity is lost.

The structural response characteristics of the shaft/impeller assembly as determined by analysis are benchmarked and fine tuned by modal testing on a prototypical shaft/impeller assembly. Prototype testing is also used to characterize response signatures as a function of bolted joint stiffness which is controlled by the integrity, or tension level, existing in the bolts. A database of shaft/impeller signatures generated by testing on the prototypical assembly provides the means by which the integrity of actual installed shaft/impeller assemblies may be assessed without disassembly of the pumps. This could be considered analogous to ringing a crack-free copy (a prototype) of the Liberty Bell and recording that response; and then comparing the response of the cracked Liberty Bell with the prototypical response.

The protypical model is easy to obtain. All operating plants carry, as an expediency, spare parts for immediate availability and facilitated repair. We simply obtain and use a spare part for the disclosed test.

Applied to the installed pumps, the test employs dynamic excitation at the exposed end of the pump shaft while the shaft assembly is suspended from the pump motor shaft by a flexible cord. Accelerometers are installed on the exposed end of the shaft to measure force inputs and the response signatures of the structure (outputs). The outputs are processed by a structural dynamics analyzer which enables characterization of modal responses, structural damping and energy absorbed by the structure. Comparison of these data with those generated on the prototype enable a characterization of differences in structural integrity by structural vibrational signature changes and provides information on which a decision, with regard to whether or not to disassemble pumps, can be made.

An object of this invention is to disclose a special cap for the suspension of and vibration of a pump shaft and impeller. Since impacting directly on critical portions of the pump shaft is to be avoided, and it is desirable to install stud mounted sensors (for optimum contact), a special cap is disclosed that accepts threaded studs, and provides an area for hammer impacting. The cap screws onto the end of a shaft and traps a ring between the end of the shaft and the cap. The cap is screwed on to the shaft and compression lock bolts are tightened against the ring. The compression of the lock bolts holds the cap tightly against the top of the shaft providing the desired functions described above.

The cap includes protruding ears. These ears make possible impacting the shaft tangentially to excite torsional modes of vibration. Radial and longitudinal vibrations are typically imparted by impacting non-critical portions of the shaft directly; however the cap can be used for such impact providing it is securely attached.

The method herein was experimentally verified on nuclear reactor coolant pumps on a proprietary basis. These particular pumps had bolts securing the pump impellers to the pump shafts. Failure of a similar pump in a similar environment had demonstrated that inspection was desirable.

During the resultant testing, pump disassembly verified the procedure herein disclosed. In one case, however, the predicted defect of loose impeller to shaft securing bolts was not found. The protocol developed herein enabled prediction of the area requiring further inspection when the originally anticipated defect was not found. An abnormality in the journal area was predicted by analysis and cracking of the journal in the journal area was subsequently discovered.

The reader will understand that the protocol herein disclosed is preferred for vertically mounted shafts having an impeller or rotor at the lower end. However, the protocol is by no means limited to just this case. Further, turbines as well as pumps are subject to the testing herein set forth. All that is required is that the boundary conditions for suspension of the spare part free of the casing be substantially the same as the boundary condition for suspension of the in use part within the casing.

It was found that the technique here developed was useful with standard computer model techniques. Actual vibration of model (either a spare part or a model of a spare part) could be compared to a theoretically generated computer model. The theoretically generated computer model could then be more accurately varied to approach the actually observed vibrations of the model. Later, and when the actual in-the-field testing of an in-the-casing pump occurred, the fine tuned computer model can be used to assist in locating unanticipated defects. For example, where a predicted defect is not found, resort to the fine tuned computer model can help locate and designate other areas for inspection once it is known that the tested model has a natural frequency varying from the norm.

If will be further understood that the vibration that is used here does not occur during machine operation. Rather, vibration is imparted when the tested pump or turbine is not operating. Data is purposefully generated from such vibrations to detect specific defects.

It will be further understood that a primary advantage of the disclosed technique is the ability to impart vibration from the exposed end of a shaft, and look for a remote defect which is deep with the pump or turbine. This ability to test for remote and otherwise inaccessible defects is particularly useful with pumps and turbines where disassembly is usually grossly inconvenient.

The test disclosed herein preferably uses the natural vibrations of the assembly consisting of the shaft and the impeller or rotor. The impacted shaft responds with natural vibrations. It is the change in these natural vibrations that is the vibrational signature of a defect.

Another object of this invention is to establish a preferred mode of vibration of the shaft and impeller. The frequency response of the shaft assembly has to be determined as a function of the defect suspected. In the preferred embodiment herein set forth this is bolt preload. There are many methods to obtain this and an evaluation was made to use the most suitable method for this application. Sine sweep testing is the traditional method. With the implementation of digitial signal processing, there are other useful techniques such as impact testing, pure random testing and periodic random testing. There are advantages and disadvantages to each method. For the preferred embodiment, the impact testing method was chosen for the following reasons:

(a) Set up and fixturing time are a minimum of all the excitation techniques.

(b) Equipment requirements are the least.

(c) It is very fast compared to sine sweep. Sine sweep takes at least 20 minutes for a measurement covering 100 Hz band width. With thousands of frequency response measurements and the time frame given, impact testing is ideal.

(d) It is ideal for use in the tight quarters for pump testing where it is difficult to fit an exciter.

(e) Past successful experience with the impact testing techniques.

DETAILED DESCRIPTION OF A SPECIFIC EMBODIMENT

Figure 1A:
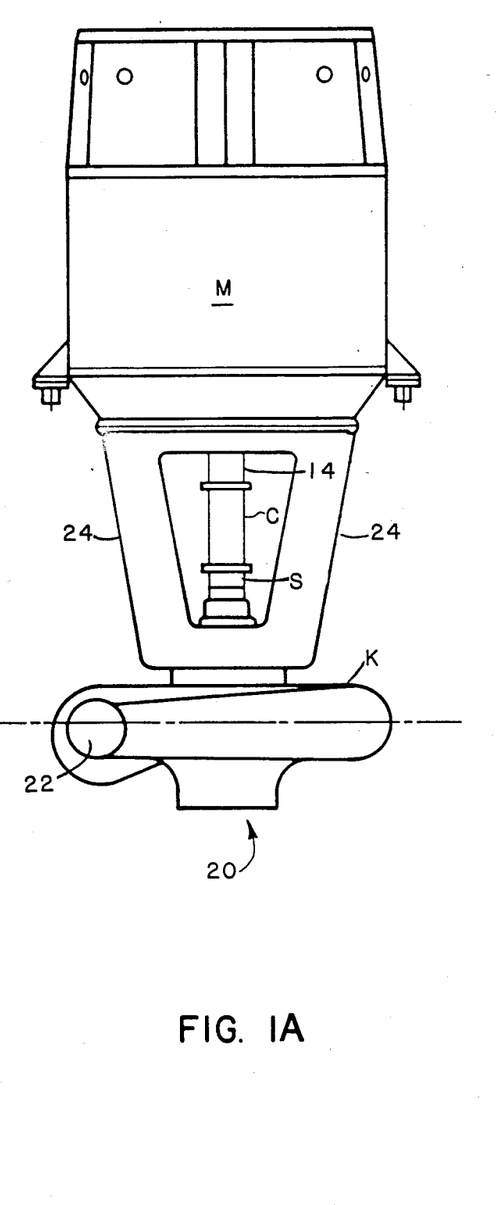
FIG. 1A is a side elevation of a pump showing the shaft within a casing with the driving motor overhead.

FIG. 1A illustrates a pump of the preferred type suitable for testing with this invention. The assembly includes a motor M driving the motor shaft 14 and shaft S of the pump. Connection of shaft 14 of motor M occurs through a coupling C. As will hereinafter be explained, it is the removal of coupling C that permits the test of this invention to conveniently occur.

Motor M is supported overlying a casing K by support 24. Casing K surrounds shaft S and attached impeller I. (See FIG. 1B.)

Pump P is typically a centrifugal pump with a central inlet 20 and a peripheral outlet 22.

In operation motor M and shaft 14 rotates coupling C and spin shaft S. Shaft S in turn rotates impeller I. Liquid drawn within inlet 20 is propelled by centrifugal force outward of outlet 22.

Typically, motor M is supported relative to casing K. Such support here happens to be illustrated by virtue of supports 24. It will be realized that other supporting mechanisms may be used. For example, attachment of the motor M to the actual building in which the pump is located can occur.

Some dimensions and practical considerations can be instructive as to the scope of the problem solved. First, the illustrated pump includes a motor weighing in the range of thirty tons, being in the order of six feet in diameter, and transmitting through the attached shaft some 9000 horsepower. The entire pump assembly stands about twelve feet high deep in the interior of nuclear plant where working conditions are other than optimum. The pump is imbedded in the usual matrix of necessary plant piping, anchors, hangers and support structures, at least some of which are required to be cut and severed to produce complete pump disassembly. Removal of the shaft/impeller requires removal of numerous studs in the order of two inches of diameter. Access is limited so that the required removal of the shaft/impeller is difficult. The pump, shaft and impeller are radioactive.

Figure 1B:
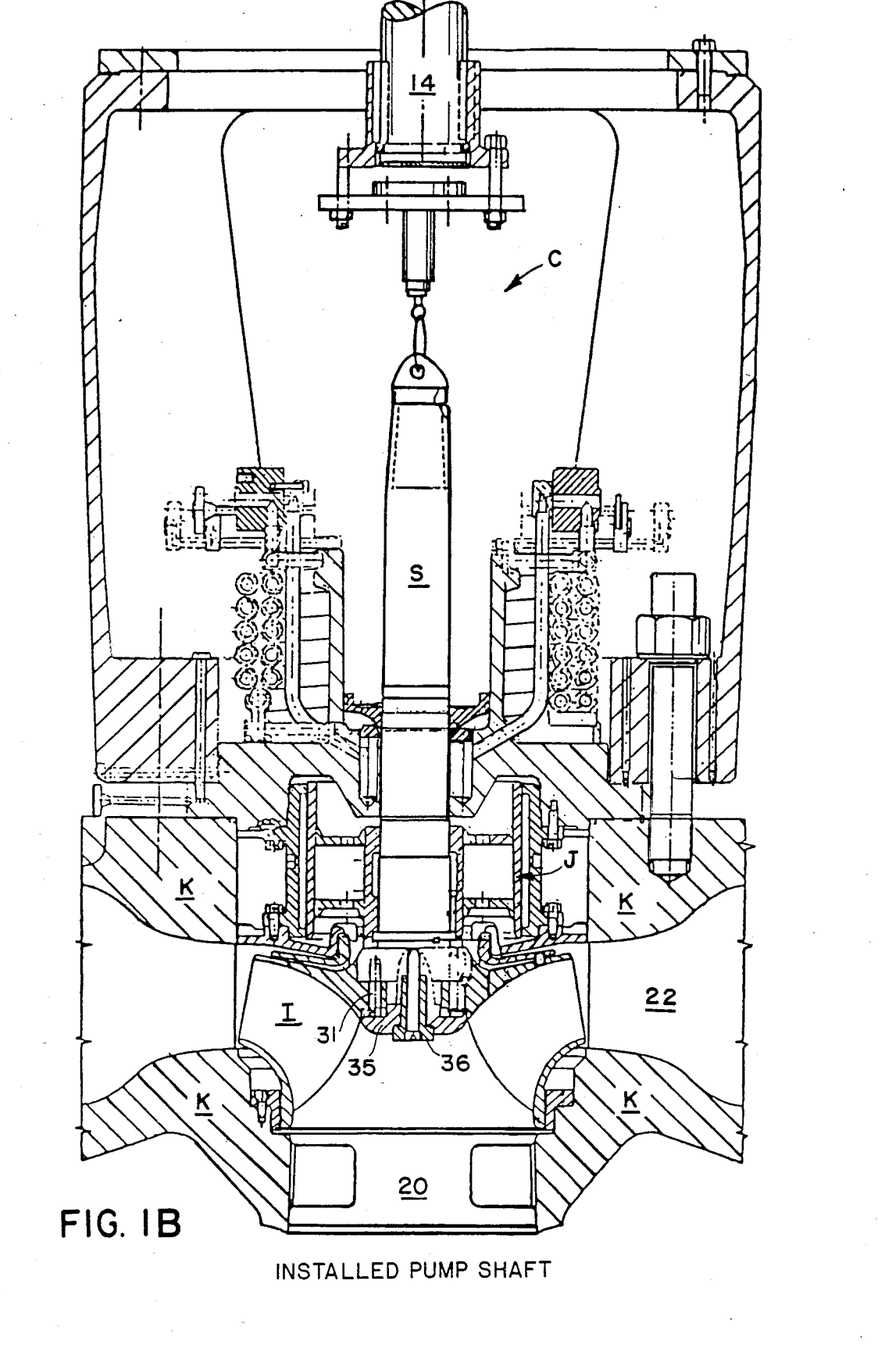
FIG. 1B is a detail illustrating the suspension of an impeller with a casing for the test disclosed by this invention.

Referring to FIG. 1B, impeller I is attached here to shaft S by four bolts 31, 32, 33, and 34 (only bolt 31 shown in the figure) although other methods of fastening could as well be used. These respective bolts are points of suspect structural integrity.

Even the bolts 31-34 are not directly exposed. A suction deflector 35, secured by a cap screw 36, covers the ends of the bolts.

For example, typically such bolts 31-34 are of stainless steel. It is known that such bolts can become subject to cracking. Likewise, the bolts may loosen due to ambient vibration.

It can be appreciated from the construction illustrated and environment discussed that disassembly of the pump P is other than convenient.

At this juncture, it will be realized that the preferred embodiment of the test was directed at an impeller secured to a shaft of a pump. Naturally, the test herein disclosed is applicable to other fastening techniques. By way of example—and not by way of exclusion—attachment could as well be by welding, shrink fit, spline connections, lugs, keys and keyways, and other known and used connections.

It should be appreciated that the shaft has either shrunk or welded thereon a journal J. Journal J forms a bearing surface with respect to the casing K for high speed rotation of the impeller.

Figure 2A:
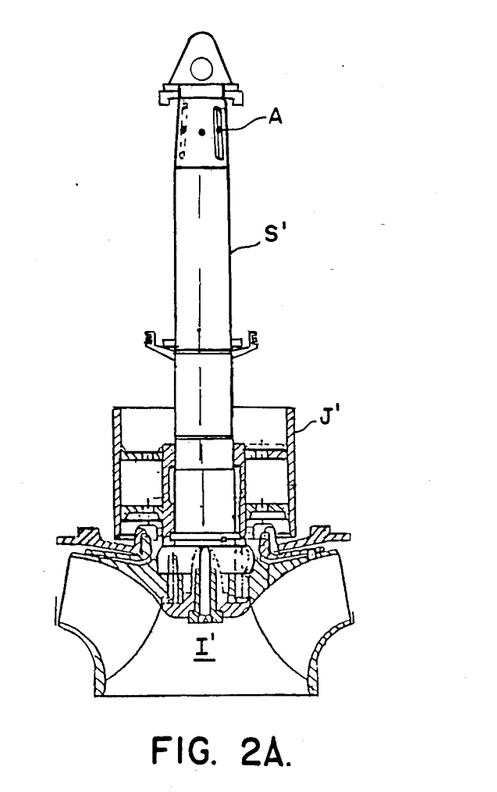
FIGS. 2A and 2B are a side elevation and section of the shaft and impeller spare part illustrating the location of accelerometers for recording and analyzing shaft response.
Figure 2B:
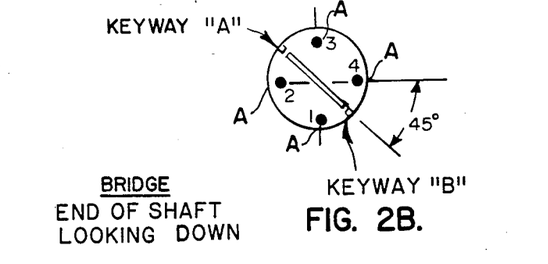

Referring to FIGS. 2A and 2B, a "spare" shaft S', journal J', and impeller I' assembly is illustrated. This assembly is typically maintained adjacent to the power plant in which pump P is located. The protocol set forth herein uses the usually conveniently available spare part for nondestructive testing and data base generation.

Figure 3:
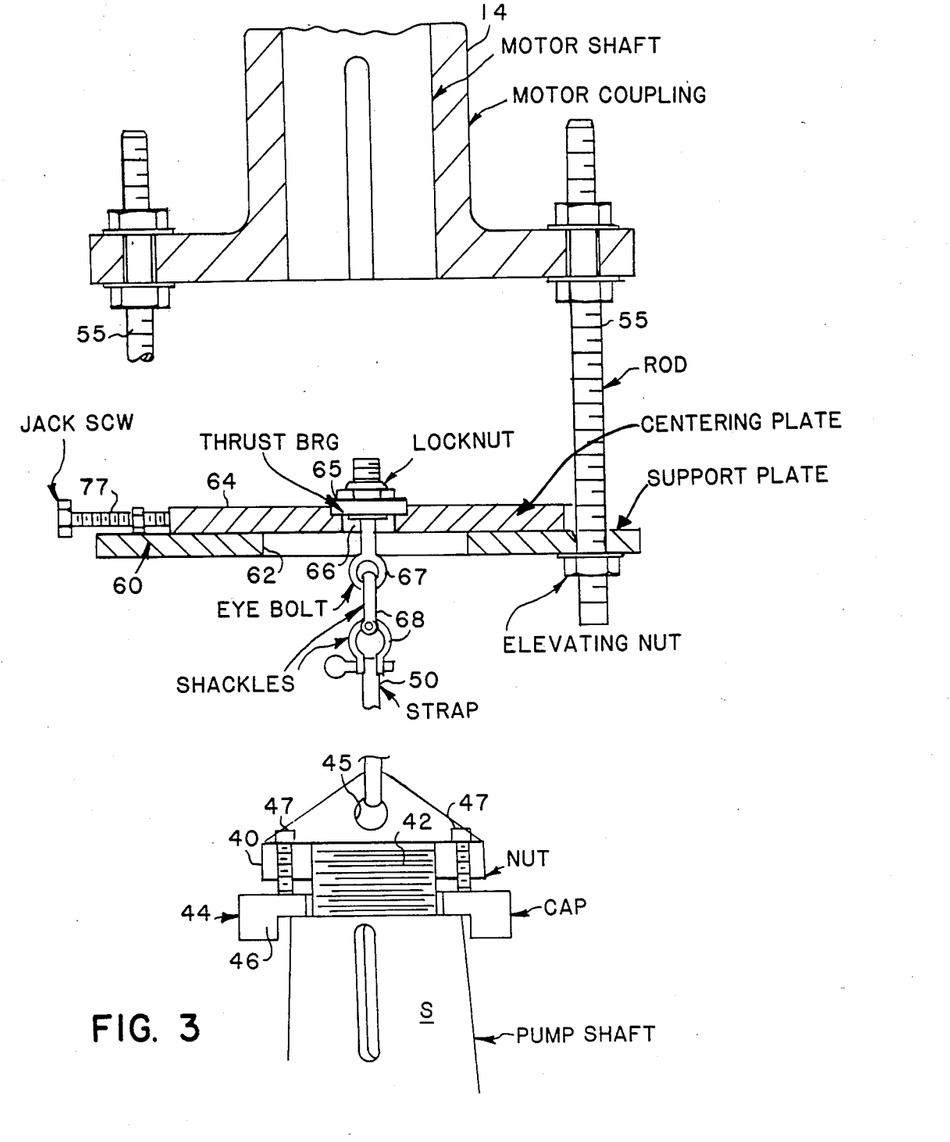
FIG. 3 is a side elevation schematic of the apparatus for suspending and centering the shaft from a motor bearing in the spatial area occupied by the removed coupling.

Referring to FIG. 3, it will be understood that the shaft S must be suspended for the vibrational test utilized herein. Accordingly, a threaded nut 40 and lower cap 44 are utilized. Nut 40 threads with female threads to male threads 42 at the top of the shaft. Nut 40 is provided with a lower cap 44. Cap 44 includes discrete ears 46. The cap member 44 is the member through which radial, tangential, and longitudinal vibrations can be imparted. In other words, the carefully machined and very expensive shaft S is not impacted during the test. Rather the cap 44 and nut 40 can be both the points of attachment and points of impact. Cap 44 is rigidly abutted against the shaft end by a series of bolts 47.

Typically, the shaft S, impeller I and journal J are all suspended from motor M at shaft 14 during operation. (See FIG. 1A.) Likewise, during the test utilized herein the shaft S is again suspended from the motor M at shaft 14. (See FIGS. 1B and 3.)

Referring to FIG. 3, the fixture used for test of the pump and impeller is illustrated. Prior to installation of the fixture the pump P was drained, the coupling C and related mechanical seals were removed. The motor coupling at the end of shaft 14 was used as a support. Four long threaded rods 55 were fastened to the motor coupling by two nuts on each rod. The bottom end of the rods retained a support plate 60 which could be raised or lowered by four nuts. A centering plate 64 rested on the support plate 60. The centering plate 64 retained a thrust bearing 65, and a spindle. The spindle supported the weight of the shaft through an eye bolt 67, shackles 68, and a nylon strap 50. By tightening the elevating nuts on rod 55 the shaft was lifted from the casing. The shaft was centered by using the four jack screws 77 to move the shaft laterally. The final centered position of the shaft was judged by visually inspecting the shaft concentricity in the pump seal housing. Additionally, the absence of lateral contact was verified by the capability to manually rotate the shaft on the thrust bearing 65 in annulus 66 and the corresponding annulus in the pump at J. In other words, if the shaft were binding in the casing the operator would not have been able to rotate the shaft by hand. Although one could have centered the shaft within 0.001 inches, accurate centering was not necessary, once the sensitivity studies showed that slight lateral contact in the pump casing would not invalidate the response data of the shaft.

The reader will appreciate that the suspensions in FIGS. 2A and 2B and as illustrated on the actual pump with respect to FIG. 3 are substantially the same. That is to say, the two suspensions include substantially the same boundary conditions. Having obtained the same boundary conditions, it can be expected that the same vibrational pattern will follow.

Figure 4:
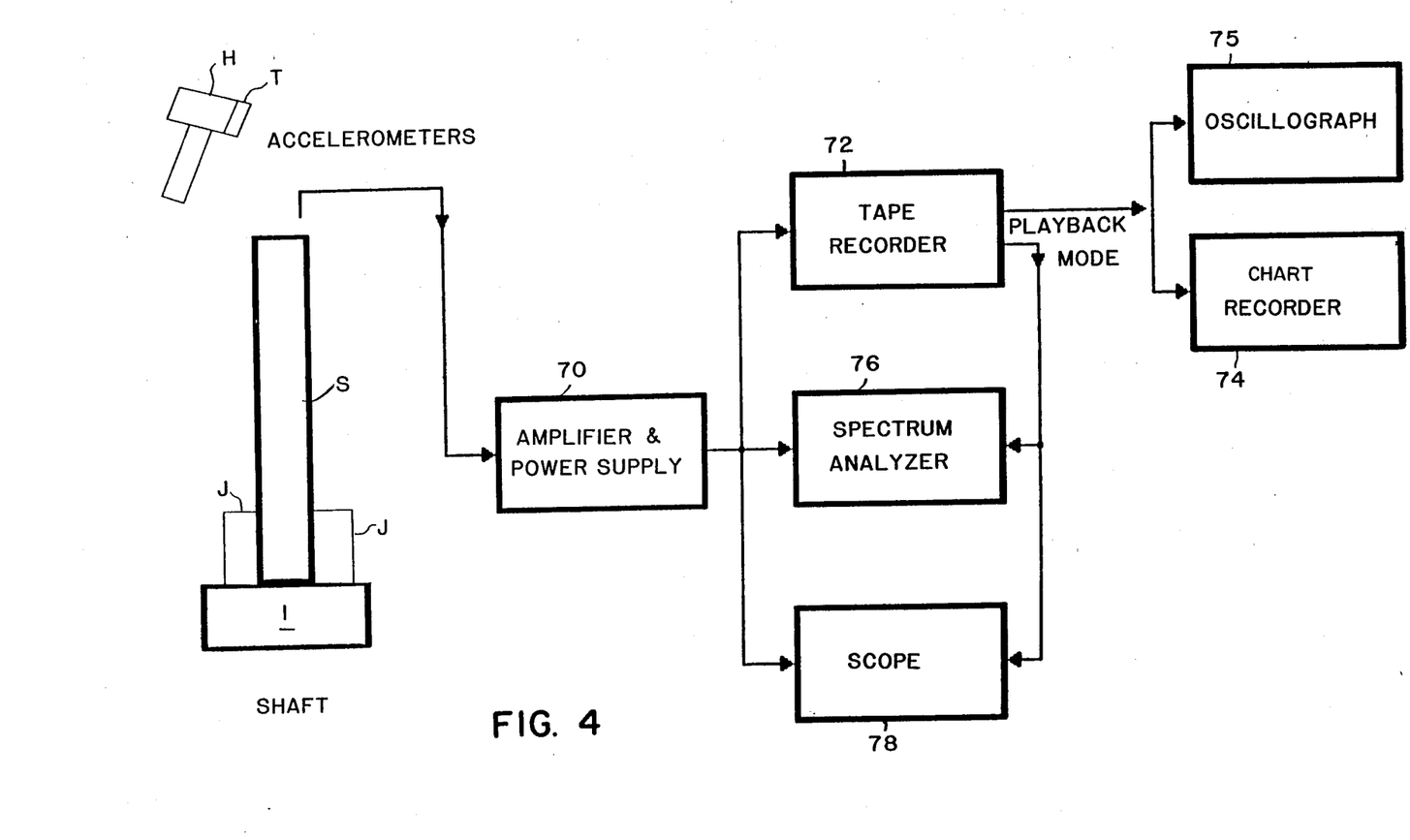
FIG. 4 is a block diagram of the instrumentation utilized for making the vibrational measurements of this invention.

Referring to FIG. 4, a schematic of the instrumentation used is illustrated.

The accelerometers were manufactured by the PCB Corporation and included those sold under the 303A series and 308B series. The amplifier 70 utilized was manufactured by the PCB Corporation of Depew, New York and sold under Model 483A07. A hammer H manufactured by the PCB Corporation and sold under Model GK291B05 was utilized for producing vibrations. The hammer preferably had a tip T of metal or plastic.

Amplifier 70 output to a tape recorder 72 manufactured by the Honeywell Corporation of Phoenix, Ariz. and sold under Model No. 101. A chart recorder 74 was utilized manufactured by Gould, Inc. of Cleveland, Ohio and sold under the specification Mark 260 Recorder.

An oscillograph recorder manufactured by the Honeywell Corporation of Phoenix, Ariz. and sold under the Model No. 1858 was utilized. A Dual Channel Spectrum Analyzer 76 manufactured by the Hewlett-Packard Corporation of Palo Alto, Calif. and sold under the Model No. 5423A was utilized. A conventional CRT scope manufactured by the Hewlett-Packard Corporation was utilized to display in real time basis vibration.

Having set forth the actual pump, the prototypical model and the connected instrumentation, actual test results conducted in the field on a proprietary basis can now be set forth.

Two series of tests were run, Base Case Tests and Sensitivity Tests. In base case tests, the response of the structure to various bolt configurations were tested with all other parameters remaining constant. In sensitivity tests, the bolt configuration remained constant while other parameters were changed to see how sensitive the structural dynamic properties were to changes in the other parameters. Both these series are described below.

Base Case Tests

Figure 6:
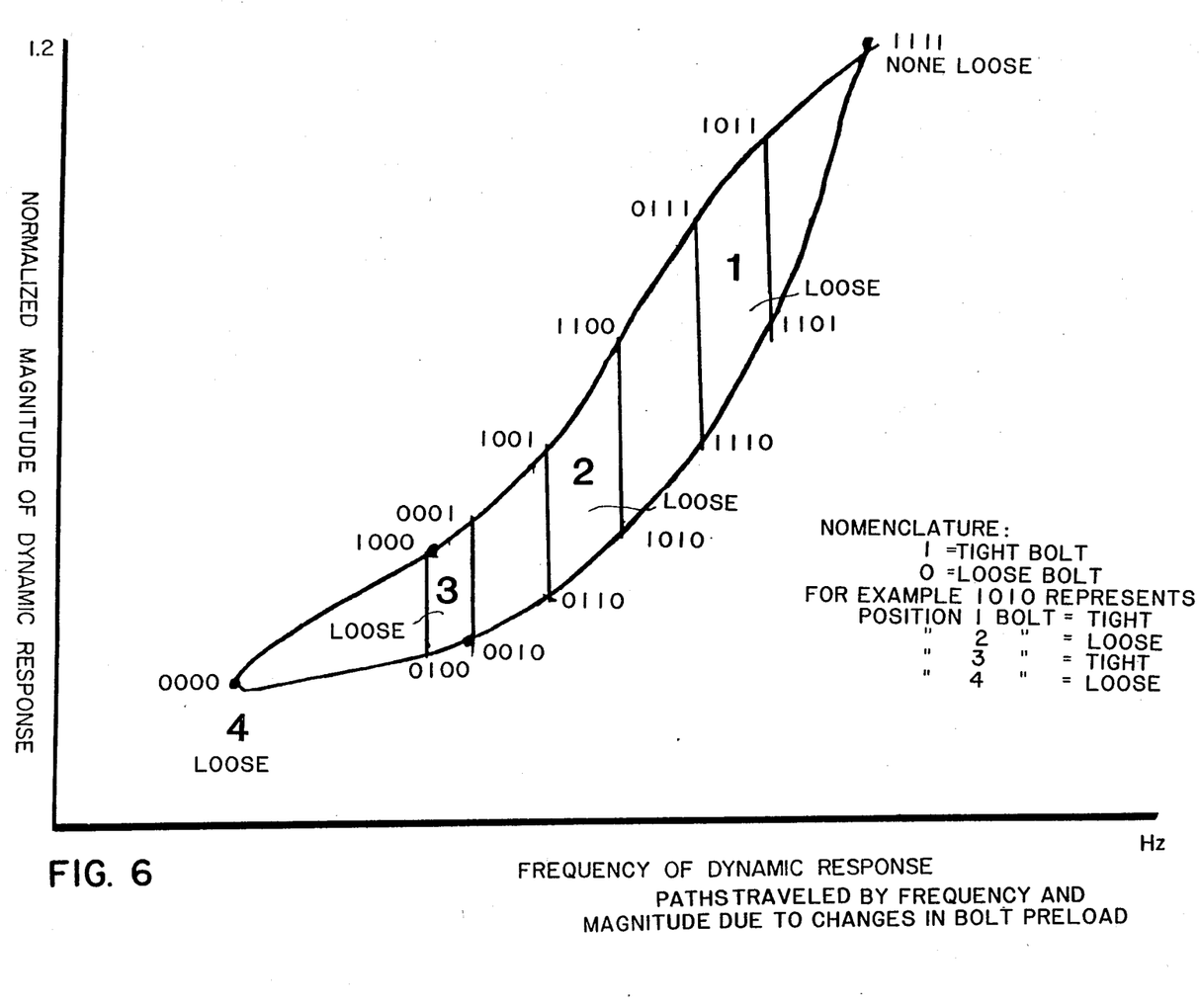

A total of 20 base case tests were run. According to the specifications of the particular pump manufacturer (Byron Jackson) the design minimum torque value for the bolts was 300 ft-lbs for a tight configuration. The first five cases included a uniform loosening of all four bolts from the all tight configuration to the all loose configuration (see FIG. 6). In actual fact, such loosening occurred in 25% steps. Referring to FIG. 6, the symbol "1" indicates complete tightness (300 ft-lbs of torque), and O indicates complete loosening. Test points were in fact generated to contain various combinations of 3 tight, 2 tight and 1 tight bolt configurations. See Table I.

TABLE I

PHASE I BASE CASE TESTS

| Test No. | Bolt Location | | | |
|---|---|---|---|---|
| | Bolt 1 | Bolt 2 | Bolt 3 | Bolt 4 |
| 1 | 1 | 1 | 1 | 1 |
| 2 | 0.75 | 0.75 | 0.75 | 0.75 |
| 3 | 0.5 | 0.5 | 0.5 | 0.5 |
| 4 | 0.25 | 0.25 | 0.25 | 0.25 |
| 5 | 0 | 0 | 0 | 0 |
| 6 | 0.5 | 1 | 1 | 1 |
| 7 | 0 | 1 | 1 | 1 |
| 8 | 1 | 0 | 1 | 1 |
| 9 | 1 | 1 | 0 | 1 |
| 10 | 1 | 1 | 1 | 0 |
| 11 | 0 | 0.5 | 1 | 1 |
| 12 | 0 | 0 | 1 | 1 |
| 13 | 0 | 1 | 0 | 1 |
| 14 | 0 | 1 | 1 | 0 |
| 15 | 0 | 0 | 0.5 | 1 |
| 16 | 0 | 0 | 0 | 1 |
| 17 | 0 | 0 | 1 | 0 |
| 18 | 0 | 1 | 0 | 0 |
| 19 | 1 | 0 | 0 | 0 |
| 20 | 0 | 0 | 0 | 0 |

Nomenclature
1 = 300 ft-lbs
0.75 = 225 ft-lbs
0.5 = 150 ft-lbs
0.25 = 75 ft-lbs
0 = 0 ft-lbs (hand tight)

For each test condition the top of the shaft was impacted at four locations. The locations were directly in line with or at the same azimuth as the bolts shown in FIG. 1B although they need not be for the general case. At each location the shaft was impacted in three directions: vertical, radial and tangential. For the radial direction both the cap and the shaft were impacted, for the tangential direction only the cap was impacted and for the vertical direction only the shaft was impacted. In each direction a minimum of 3 hits with the instrumented hammer were performed. The actual number of hits varied until a high coherence between the input and response was obtained.

Sensitivity Tests

In order to establish the feasibility of the concept for field application, and to study the sensitivity of the results to the pertinent variables the following tests were conducted in addition to the base case tests:

(a) Sensitivity to Weight Changes

The pump impellers are typically sand-cast, and consequently are subject to greater variation of thicknesses throughout as compared to a forged or bar partial form. Variations are results of systematic movement of cores during casting. The variation in the finished weight of the impeller was estimated not to exceed 5%.

In a disc-shaft mockup similar to FIGS. 2A and 2B, but not using an expensive replacement spare part, a shaft and disc were used. The disc was used to emulate and simulate the mass of the impeller I. Sensitivity due to weight variation was studied by adding weight to the disc and comparing the impact response with base case results.

(b) Sensitivity to the Cap

The cap 44 and nut 40 adds another interface connection to the shaft assembly. In addition it adds mass to the system. In order to evaluate the effects of the cap two tests were conducted.

(1) The accelerometer was installed on the cap. Impacts were imparted to the cap and the shaft and the resulting frequency responses were compared.

(2) One accelerometer was installed on the cap and another accelerometer was installed on top of the shaft. Impacts were imparted to the cap and the shaft and the resulting frequency responses of both accelerometers were compared.

The cap 44 and nut 40 described was tested to establish its influence on the data. If the cap is not attached rigidly enough (in one extreme, loosely fitted) then it would tend to rattle against the shaft during the impact-response period and generate anamolous signals. Therefore, the tightness of the cap and its total contact area with the shaft becomes significant. The other consideration with the cap was the natural frequency of the cap itself. The cap was sized such that its lowest natural frequency would be outside the range of interest. This was verified by test.

(c) Sensitivity to Lateral Supports

There was concern that in the installed pump it may not be practical to suspend the pump shaft in a free state, that is, without the shaft touching the bearing or pump casing at some point. Hence a "lean test" was conducted to resolve this concern. A subset of the main matrix tests was repeated with the shaft leaning several degrees out of plumb and contacting an external surface thus simulating a condition of the pump shaft leaning against the pump bearing.

In the prototype shaft there is a wear ring which may or may not be in contact with the journal at some point. Hence it was necessary to find the frequency response of the structure for the non-contacting and various contacting positions and compare. During the test a piece of wood was wedged between the wear ring and journal at various points to ensure contact. The resistance between the wear ring and journal was measured as a measure of contact. It was not possible to physically achieve a complete non-contacting configuration because there was always some point of contact around the circumference due to the very small clearance. Hence various contacting configurations were tested and compared.

(d) Effect of Deflector and Cap Screw

There is a deflector 35 and cap screw 36 at the bottom of the shaft and over the impeller I which have to be removed in order to access the bolts for tensioning and detensioning. Removing and reinstalling the deflector and cap screw after each test point required about half an hour and this required an exorbitant amount of total time considering more than 140 test points and the various sensitivity studies. Hence a decision was made to compare the frequency responses with and without the deflector and cap screw and see if they could be removed for the duration of the testing.

(e) Cracked Bolts

The prototype was also tested for various cracked bolt configurations. Four bolts were quarter radius cracked (QC) and four bolts were half radius cracked (HC). The cracks in all eight bolts were simulated by grooves all the way around the circumference. Various combinations of QC bolts and HC bolts were tested leading to a total of twenty-eight cracked bolt configurations. The cracked bolts were tightened to a maximum bolt torque of 150 ft-lbs to simulate preload loss due to cracking and to maintain acceptably low bolt stress levels due to the applied torque.

(f) Effect of Hammer and Tip

Various hammer types H, tips T and added masses (to the hammer) were tested to obtain the proper frequency response of the shaft structure. The results indicated the following:

1. For the small hammer the force range attainable was 100 lbs to 150 lbs. For medium hammers, up to 1000 lbs could be achieved.
2. The effect of added mass is to give higher force.
3. Rubber tip results were not reliable.

Based on the above, the medium hammer (which can generate up to 1000 lbs force) with added mass was selected. The choice of tips was now narrowed down to plastic and steel tips. The plastic tip yields good frequency response only to about 1500 Hz. The steel tip goes up to 5000 Hz. However the steel tip left scar marks on the surface of impact while the plastic tip left no visible scars. Hence it was decided that for all critical surfaces (the circumferential portion of the shaft) only the plastic tip would be used. For the non-critical surfaces such as the keyway and the top of the shaft steel tip would be used.

The selection of the proper hammer and tip is critical to the structural response characteristics especially in the frequency domain used. A hammer manufactured by PCB Corporation and sold under Model GK 291B05 was utilized. Three hammer types were tested: Small, medium and large. For the small and medium hammers three different types of tips were tested—steel, plastic and rubber. For each tip tests were run with and without added mass. In each series the hammer force was also varied to study the effects of varying hammer forces.

Findings

It was found after appropriate testing as described above:

1. For the prototype shaft the condition of 1 or more bolts loose can be predicted with confidence.
2. The exact combination of loose bolts cannot be made accurately since various combinations can lead to one frequency response. However, qualitative judgements on a directional basis can be made and the total loss of preload can be predicted.
3. The most effective frequency range for prediction is 0 Hz to 500 Hz.
4. The radial modes frequencies are the most sensitive to bolt preload changes.

5. The vertical modes and torsional modes are not sensitive to bolt preload changes.

6. Accelerometers were preferably installed on the shaft and not on the cap. It will be realized that this may not always be the case; some installation may permit installation on the cap.

7. The contact of the wear ring with the journal has no effect on the frequency response.

8. The deflector and cap screw lower the frequency response by 1% or 2%.

9. Proper hammer and tip selection is vital to obtain the right results. A medium hammer with a steel tip is best suited for the shaft impact applications on non-critical surfaces while a small hammer with plastic tip is needed for impacts on critical surfaces.

10. The journal leaning against a support will not affect the response of the shaft significantly.

11. The shaft dynamic response is a function of the preload and the presence of bolt cracks do not affect its dynamic response as long as the preload is maintained.

12. Small variations in weight of impeller I as well as centering of the mass of impeller I do not affect overall response.

13. The shaft leaning against a bearing does not significantly affect overall response.

Data Generation

The reader will understand that a voluminous data base of vibrational signatures was completed with the pump shaft suspended in a flexible manner (chain or nylon strap). The pump shaft and its mock-up were suspended to simulate a free state. A free state was chosen to simplify the analytical work (boundary conditions and modeling) and eliminate the interaction of impeller (or disc) with its support which would be the floor (in case of the prototype), and pump casing (in case of the final tests on A, B, C and D pumps). It was necessary to duplicate the free boundary conditions for all the testing of the prototype.

The response of the instrumented pump shafts were detected by sensors mounted on top of the shaft. The vibration amplitude signals from the sensors were amplified so as to result in a sensitivity ranging from 1 to 10 g per volt.

The sensor locations are shown in FIG. 2. A total of 6 triaxial accelerometers were used, four on top of the shaft and one on each keyway. All the accelerometers were epoxy mounted.

Cables 100 feet long were strung from the pumps to the refueling floor location where the data acquisition system was set up. The signals from all the sensors were recorded simultaneously on magnetic tape during the test. Two Honeywell 101 tape recorders were used for this purpose. A dual channel spectrum analyzer was used for data acquisition and reduction. The quality of hammer hits was judged by observing the force pulse on one channel and the response on the second channel. The number of impacts were determined by the coherence function computed by the spectrum analyzer. Usually 5 to 10 impacts were done for each location and direction.

Comparison of Test Results to Analytic Results

A computer model was built using SUPERTAB, an interactive graphics program developed by GE/CAE for construction of fine element models and display of analytical results. The computer model was for the prototype pump shaft assembly. Included in this model are the stepped-up shaft, the journal, the shaft cap, and the impeller.

The purpose of the computer analysis was to gain insight on the dynamic motion of the prototype. More specifically the prototype testing raised some questions about the third radial mode and the torsional frequencies that required knowledge of the mode shapes to gain understanding.

Figure 5:
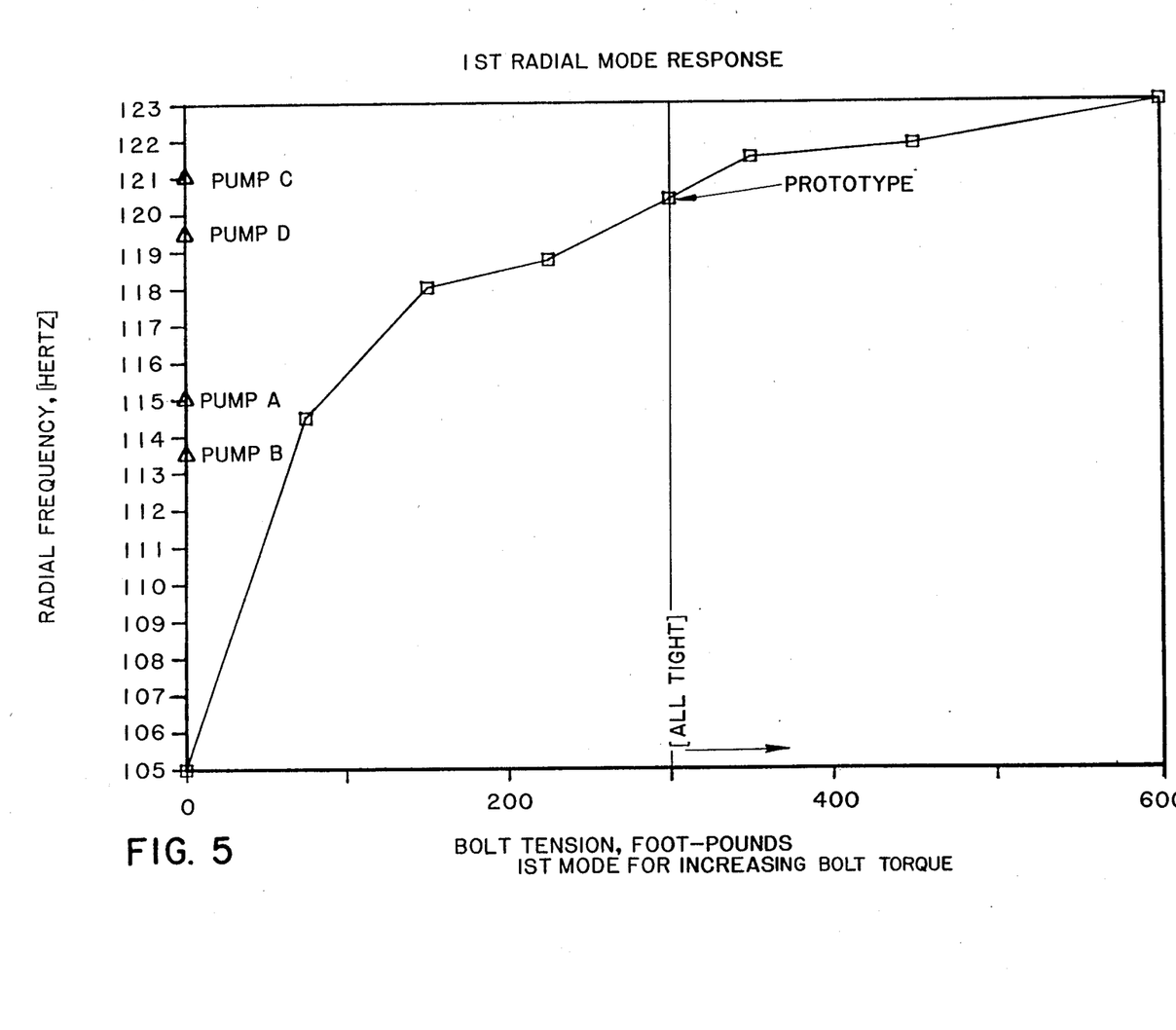
FIG. 5 is a plot of the first radial mode response of the prototype with appropriate field tests plotted on the ordinate; and, FIG. 6 is a plot of the paths traveled by frequency and magnitude due to changes in bolt preload.

As shown in FIGS. 5 and 6, the prototype data reveals that the response frequency for each particular mode increases less and less for an increase in bolt torque for high torque values. Or rather, the trend observed for the 0–600 ft-lbs range seems to indicate that the natural frequency asymptotically reaches some constant value at a torque higher than 600 ft-lbs. For example, given the observed shape, the first radial mode is not expected to achieve a much higher value than the 123 Hz value observed at 600 ft-lbs. It was found that the second and forth radial modes (not shown) however seem to have a way to go before reaching their asymptotic value. The third mode (also not shown), on the other hand, has reached its asymptotic value quite fast (by 150 ft-lbs). Comparing the prototype data at 600 ft-lbs preload directly with the model results in the following frequency table:

| Radial Mode | 600 ft-lbs Test Results | Computer Analysis Results |
|---|---|---|
| 1 | 123 | 135 |
| 2 | 287 | 387 |
| 3 | 484 | 475 |
| 4 | 659 | 776 |

The computer generated model was improved using the model tests. From these improved model, more accurate predictions from the computer model could be made. For example, when the anticipated loose bolt was not located in one pump tested in the field, it was possible to predict the general area of another defect—in this case a cracked bearing journal.

General Conclusions

Consistent with the above observations, the preload-sensitive first, second, and forth radial modes are lower than the "extremely tight" (rigid) model. Therefore, the modeling of an all tight condition as a continuous interface or rather a rigid interface would represent the case where all four radial frequencies have reached their asymptotic values (bolts have torque substantially in excess of 600 ft-lbs). The third mode, however, is lower for the model as compared to experiment. This 2% discrepancy is quite small, and therefore experiment and analysis may be considered essentially equal.

Recognized as being quite different from the other radial modes, the third radial mode did not change for the increased bolt torque above 150 ft-lbs during the prototype testing. The analysis revealed why this was so. Looking at the mode shape at this particular frequency, the primary vibration is much above the beam-impeller interface with the journal acting as the inertial anchor. Therefore any changes within the static region (i.e., loose bolts) does not alter the stiffness of the vibrating region and as a consequence the frequency would not be expected to change for a change in joint stiffness.

Model analysis was conducted to support data interpretation and hypotheses evaluation. The conclusions reached using the analysis are as follows:

1. A cracked journal can significantly lower both the radial and tangential frequencies.

2. A loose journal can significaantly lower both the radial and tangential frequencies.

3. The analytical frequencies are consistently higher than experiment due to the rigidly modeled joint section.

4. The third radial mode and all torsional modes are not sensitive to bolt preload.

5. The third radial mode and all torsional modes are sensitive to cracked or loose journal.

Stress analysis was conducted to study the variation of the compressive stress profile surrounding each bolt with preload and the effect of cracked bolts. The conclusions from the stress analysis are as follows:

1. For each bolt and change in the compressive stress profile is non-linear with respect to bolt preload. For a 50% decrease in preload there is only a 20% reduction in the radius of the contact zone.

2. Sizeable cracking may be present in the bolts with very little loss in preload or clamping force. Hence the dynamic response of the system will not change appreciably in the presence of cracks unless very deep cracks are present.

The methodology consisted of characterizing structural dynamic response as a function of bolting preload thus creating a database and then comparing the pump structural dynamic response with this database. The dynamic response characteristics such as frequencies and mode shapes vary not only with preload but also with any parameter which affects the stiffness of the structure such as crack or looseness in the shaft, journal or impeller. When only one parameter is varying such as preload while the other parameters are held constant, accurate predictions can be made on the preload. If the other parameters also vary, it is difficult to separate the effects of each parameter and detailed logical investigations are necessary to isolate the contribution of each parameter.

For the case where only preload is the affected parameter, the condition of 1 or more loose bolts can be predicted with confidence. The exact combination of loose bolts cannot be made accurately since various combinations can lead to one frequency response. However, qualitative judgements on a directional basis can be made and the total loss of preload can be predicted. For the pump shafts under study the most effective indicators are the radial modes. The axial and torsional modes are not sensitive to preload changes. Small variation in impeller mass as well as contacts of the journal with bearings do not affect the frequency response of the shaft.

The test and analysis data obtained on a proprietary basis indicted that Pump A had the largest frequency deviation from the prototype followed by Pump B, Pump D and Pump C. Thus, the decision was made to disassemble Pump A. The data also indicated that all bolts on all pump impellers have tension corresponding to more than 300 ft-lbs of torque. Deductions from the data analysis also showed that the journals in the A and B pumps are more flexible than C and D. Disassembly of Pump A in conjunction with process adjustments which were verified by test demonstrated a viable method for future application.

We have shown the induced vibration of a pump with the casing fully drained. The reader will understand that the test could as well be carried out with the casing partially or fully flooded. Such flooding would constitute an observed boundary condition. Naturally, the only limitation would be that the model have vibration imparted to it under the same fully or partially flooded boundary condition.

In the specification, we have had the preferred embodiment relate to a pump having a vertical shaft. Those skilled in the art will understand that the disclosed technique is applicable as well to pumps and turbines having horizontal suspension.

It will also be appreciated that we have altered the normal in casing boundary conditions of the actual pump to meet the suspended boundary conditions of the model. Alternately, the boundary conditions of the model could be altered to meet the boundary conditions of the actual pump. Further, both boundary conditions could be altered—so long as the ultimate boundary conditions of suspension are comparable.

It is the usual condition that boundary conditions within the pump are the most difficult to modify. Therefore, it will be the usual case that the boundary conditions of the model are conformed to the most convenient boundary conditions found in the actual pump.

During the a portion of the development of the test disclosed herein, it became apparent that it would be ideal if a preinstrumented cap could be fastened to the end of the pump. This cap could then serve as both the site for the impact of the instrumented hammer as well as the attachment point for all of the accelerometers. Unfortunately, the addition of the cap was an additional interface. The effect of this interface was not always precisely reproducible. It was found that attachment of the accelerometers directly to the shaft was more desirable for reproducible results. Further, in striking the shaft to induce vibration, the cap was only used for inducing torsional vibrations. Longitudinal and radial vibrations were induced by striking the shaft directly on non critical areas where any dents of the hammer would not interfere with the assembled pump operation.

In the particular test here illustrated, the cap was required for the conduct of the test. It will be realized that in many tests, caps will not be required. For example, existing bores within the shaft and impeller or rotor could as well be used. Further, and where no permanent damage to the shaft will occur, a hole could be placed for the required suspension.

The reader will likewise appreciate that we generated an extremely large data base, the results of only a small fraction of that data base are disclosed here. Since such data bases are only applicable to particular cases, and further since this application clearly sets forth how such data bases can be generated, further disclosure is not made.

It should be noted that often the "observation" of the boundary conditions of suspension in an installed pump will constitute reference to manufactures manuals, blue prints, and similar reference materials. The term "observation" is used in this sense.

What is claimed is:

1. A process of testing a casing-enclosed shaft and impeller without removal of said shaft and impeller comprising the steps of:

placing said casing-enclosed shaft and impeller in a static condition;

suspending the casing-enclosed shaft and impeller in the casing;

observing said suspended casing-enclosed shaft and impeller as suspended relative to said casing and noting the boundary conditions of said suspension;

suspending a model of said shaft and impeller exterior of a casing and duplicating said observed boundary conditions of suspension:

vibrating said model as suspended with said duplicated boundary conditions of suspension;

simultaneous with said vibrating of said model reproducing suspected defects of said suspended casing-enclosed shaft and impeller on said model of said shaft and impeller;

analyzing the vibrational signature of said model of said shaft and impeller and correlating said signature to said reproduced defects;

vibrating said suspended casing-enclosed shaft and impeller without disassembly, analyzing the vibrational signature of said casing-enclosed shaft and impeller; and, correlating the vibrational signature of said model of said shaft and impeller to the vibrational signature of said suspended casing-enclosed shaft and impeller to determine the structural integrity of said suspended shaft and impeller.

2. The process of claim 1 and wherein said suspending a model step includes suspending a spare part of said casing-enclosed shaft and impeller.

3. The process of claim 1 and wherein said vibrating steps includes impacting with an instrumented hammer.

4. The process of claim 1 and wherein said vibrating steps include the steps of vibrating at natural frequencies.

5. The process of claim 1 and wherein said vibrating steps include vibrating said shaft remote from said impeller or rotor to detect defects in the vicinity of said impeller or rotor.

6. The process of claim 1 and wherein said process includes the step of constructing a model of said shaft and impeller or rotor.

7. The process of testing a casing-enclosed shaft and impeller without casing disassembly, said shaft and impeller of the type having an overlying motor for rotating a shaft and a shaft attached impeller enclosed within a casing, said shaft connected to said motor by a coupling, said process comprising the steps of:

placing said casing-enclosed shaft and impeller, in a static condition;

removing said coupling;

suspending said shaft and impeller from said motor relative to said casing and observing said casing-enclosed shaft and impeller boundary conditions of suspension;

suspending a model of said shaft and impeller exterior of said casing and duplicating said observed casing-enclosed shaft and impeller boundary conditions of suspension;

vibrating said model as suspended with said duplicated casing-enclosed shaft and impeller boundary conditions of suspension;

simultaneous with said vibrating of said model reproducing suspected defects of said casing-enclosed shaft and impeller on said model of said casing-enclosed shaft and impeller;

analyzing the vibrational signature of said model of said casing-enclosed shaft and impeller and correlating said signature to said reproduced suspected defects;

vibrating said suspended shaft and impeller of said casing-enclosed shaft and impeller without removal from said casing; and, analyzing the vibrational signature of said suspended casing-enclosed shaft and impeller; and, correlating the vibrational signature of said model to the vibrational signature of said suspended casing-enclosed shaft and impeller to determine the structural integrity of said casing-enclosed shaft and impeller.

8. The process of claim 7 and wherein said suspended model is a spare part of said casing-enclosed shaft and impeller.

9. The process of claim 7 and wherein said step of suspending said shaft and impeller from said motor relative to said casing occurs after vibration of said model.

10. The process of testing a casing-enclosed turbine without turbine disassembly, said turbine of the type having a turbine shaft and shaft attached rotor without a casing, said shaft connected to said rotor by a coupling, said process comprising the steps of:

placing said turbine, including said casing-enclosed shaft and rotor, in a static condition;

removing said coupling;

suspending said casing-enclosed shaft and rotor of said turbine from said generator relative to said casing and observing said turbine boundary conditions of suspension;

suspending a model of said shaft and rotor exterior of said casing and duplicating said observed turbine boundary conditions of suspension;

vibrating said model as suspended with said duplicated turbine boundary conditions of suspension;

simultaneous with said vibrating of said model reproducing suspected defects of said turbine shaft and rotor on said model of said turbine shaft and rotor;

analyzing the vibrational signature of said model of said turbine shaft and rotor and correlating said signature to said reproduced suspected defects;

vibrating said suspended casing-enclosed shaft and rotor of said turbine without removal of said casing; and, analyzing the vibrational signature of said shaft and rotor of said turbine; and, correlating the vibrational signature of said model of said shaft and rotor to the vibrational signature of said suspended casing-enclosed shaft and rotor of said turbine to determine the structural integrity of said casing-enclosed shaft and rotor of said turbine.

* * * * *